United States Patent [19]  [11] 4,248,709
Irving  [45] Feb. 3, 1981

[54] METHOD OF FILTERING SEWER SCUM AND APPARATUS THEREFOR

[76] Inventor: Robert Irving, 18495 Sunset, Detroit, Mich. 48234

[21] Appl. No.: 73,260

[22] Filed: Sep. 7, 1979

[51] Int. Cl.³ .............................................. C02F 1/40
[52] U.S. Cl. .................................... 210/769; 210/217; 210/403; 210/411; 210/771; 210/784; 210/774; 210/608
[58] Field of Search ...................... 204/11, 238, 295; 210/13, 66–68, 71, 735, 77, 78, 82, 217, 256, 326, 328, 333 R, 360 A, 380 H, 393, 403, 404, 411, 63 R, 69

[56] References Cited

U.S. PATENT DOCUMENTS

| 739,049 | 9/1903 | Wood | 210/251 |
| 2,022,069 | 11/1935 | Whitmore | 210/77 |
| 2,379,754 | 7/1945 | Selensky | 210/67 |
| 2,897,149 | 7/1959 | Griffith | 210/13 |
| 3,278,039 | 10/1966 | Nilsson | 210/403 |
| 3,285,416 | 11/1966 | Eltenton | 210/77 |
| 3,475,178 | 10/1969 | Zebarth et al. | 210/77 |
| 3,909,410 | 9/1975 | Neukamm | 210/71 |
| 3,936,378 | 2/1976 | Kawada | 210/403 |
| 3,946,679 | 3/1976 | Varani | 210/71 |
| 4,140,629 | 2/1979 | Martindale | 210/403 |

Primary Examiner—Peter A. Hruskoci
Attorney, Agent, or Firm—Cullen, Sloman, Cantor, Grauer, Scott & Rutherford

[57] ABSTRACT

The method of treating sewer scum including combustibles and debris includes the steps of collecting the scum from sewage, delivering it to a perforated filter drum, continuously rotating the drum upon an inclined longitudinal axis, applying heated air under pressure to the exterior of the drum along its length inwardly of the perforations, discharging the debris continuously and collecting the filtered combustibles. Apparatus for filtering said scum includes an elongated cylindrical perforated drum rotatable on an inclined axis receiving scum at its upper end and discharging debris at its lower end. A cylindrical shell sealingly encloses the perforated portion of the drum for providing a pressure chamber above the drum and a collection chamber below the drum. An elongated air channel along the interior of the shell delivers high pressure heated air to said pressure chamber and filtered scum accumulates in the collection chamber.

25 Claims, 3 Drawing Figures

METHOD OF FILTERING SEWER SCUM AND APPARATUS THEREFOR

BACKGROUND OF THE INVENTION

Heretofore efforts have been made to extract the potential heat energy from the sewage scum for heating purposes. Laboratory studies have shown that the scum is mainly grease having a potential energy of approximately 6000 BTU's per gallon, approximately the same as number six fuel oil.

One of the biggest obstacles in using the scum was the separation out from the grease of floating debris in the form of rocks, sticks, cardboard, plastic items, sand and so forth.

Heretofore apparatus has been known and used for the treatment of fluid waste products and sewage. Examples are found in the following U.S. Pats:

| NUMBER | DATE |
| --- | --- |
| 739,049 | 1903 |
| 3,909,410 | 1975 |
| 3,946,679 | 1976 |
| 3,475,178 | 1969 |
| 2,022,069 | 1935 |
| 2,379,754 | 1945 |
| 3,936,378 | 1976 |

The foregoing were found in Patent Office Class 210, subclasses 67, 71, 72, 77, 81 and 403.

SUMMARY OF THE INVENTION

It is an object of the present invention to provide an improved method for treating sewer scum which includes combustibles and debris and wherein the debris is filtered out from the scum for accumulating fluid combustibles.

It is another object to provide a method for the treating of sewer scum which includes the steps of collecting the scum from sewage and delivering the scum through a perforated filter drum while continuously rotating the drum upon a longitudinal axis inclined at an acute angle.

The method includes the step of applying heated air under pressure to the exterior wall of the drum along a line over its length and through the perforations therein during continuous rotation of the drum for successively lifting the debris from the perforations, heating and melting the combustibles and for advancing the accumulated debris along the length of the drum. Further steps including discharging the debris from the drum and the continuous collecting of filtered combustibles from the drum.

In the present method air is delivered to a pressure chamber enclosing the drum at approximately 1000 CFM, however, this can be varied between 500 and 1500 CFM. The air is delivered at a temperature in the range of 200 to 300 degrees F., approximately, preferably at 250 degrees.

While a preferred angle of inclination is 20° approximately, this angle can be varied as desired. The drum is rotated at a speed of between 1 and 20 rpm. The collected scum is preheated before delivery to the filter drum.

It is another object to provide apparatus for the filtering of sewer scum which contains combustibles and debris which includes an elongated cylindrical drum having a perforated portion throughout 360° and throughout a substantial portion of its length and whose longitudinal axis is mounted and journaled upon a support and inclined at an acute angle to the horizontal. A rotative drive means is connected to the drum for continuously rotating the drum with the drum having an apertured upper end wall adapted to continuously receive preheated sewer scum and wherein the lower end wall of the drum is apertured for the axial discharge of collected debris. A cylindrical shell sealingly encloses the perforated portion of the drum and defines relative to the drum a pressure chamber thereabove and a filter scum collection chamber below the drum. An elongated air channel upon the interior of the shell along its length within the pressure chamber has a throated outlet extending along and spaced from the perforations of the drum for delivering high pressure heated air to exterior surface portions of the drum for direction thereinto. A plenum is mounted upon and connected to the shell intermediate its length and has an outlet which communicates with the channel. The plenum has an inlet which is connected through a suitable duct to the outlet of an air blower which has a heater for delivering heated air under pressure to said plenum. The shell has a valve outlet adjacent its lower end for delivery of scum from the collection chamber.

These and other objects will be seen from the following specification and claims in conjunction with the appended drawings in which:

THE DRAWINGS

Figure 1:
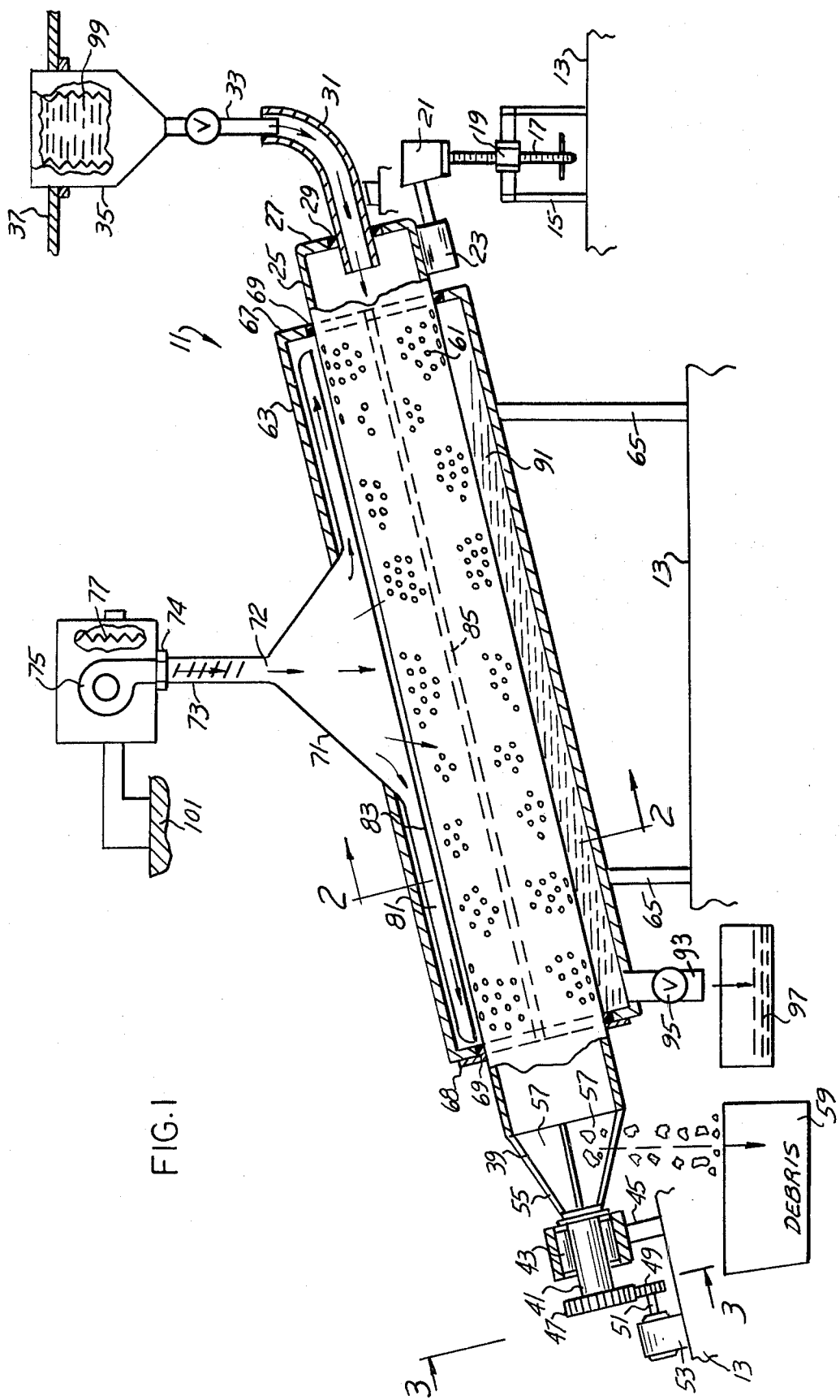
FIG. 1 is a fragmentary and schematic longitudinal section of illustrative filter apparatus for carrying out the present method.

It will be understood that the above drawing illustrates merely a preferred embodiment of the apparatus for carrying out the present method and that other embodiments are contemplated within the scope of the claims hereafter set forth.

DETAILED DESCRIPTION OF A PREFERRED EMBODIMENT OF THE APPARATUS

Referring to the drawings the present reclamation apparatus for sewage scum is generally indicated at 11 and is adapted for the filtering of sewage scum which contains combustibles and debris. Upon a suitable support schematically shown in FIG. 1 at 13 is an upright base 15 mounting an adjustable screw 17 which extends through nut 19 on said base and adjustably supports block 21 which journals a pair of laterally spaced rollers 23.

An elongated cylindrical drum 25, in the illustrative embodiment 20 feet long and 2.5 feet in diameter, is cradled and supported and journaled at its upper end upon rollers 23 and has a centrally apertured upper inlet wall 27 and an annular seal 29 for snugly receiving a portion of the delivery tube or feed pipe 31, fragmentarily shown. Said pipe receives the outlet 33 from the scum storage hopper 35 which contains scum from municipal sewage, for example.

This scum is usually skimmed off the top of the municipal sewage and normally includes combustibles such as grease or the like mixed with small stones or rocks, sticks, cardboard, plastic items, sand, etc. The scum hopper 35 is suitably supported at 37 and includes an internal heating means 99 by which the collected scum within the hopper is preheated.

A control valve V is schematically shown upon the hopper outlet 33 for controlling the flow of preheated scum to the delivery tube 31 for axial projection into the upper end of the rotatable drum 25. The lower end of the drum has a debris discharge end 39 of tapered conical shape and terminates in the axial shank 41 journaled and retained within the bearings 43 upon the bearing mount 45 on support 13.

Drive gear 47 is secured upon shank 41 and is in mesh with pinion 49 upon drive shaft 51 of the electric motor 53 schematically shown and mounted upon support 13. The conical end wall of the drum has a series of tapered elongated debris outlets 57 defined by a series of spaced axial tapered ribs 55. During continuous rotation of the drum, debris separated from the scum moves downwardly and ultimately collects at the lower end thereof and discharges through the lower-most of the outlets 57 and falls into collector 59.

The exterior surface of the drum throughout a substantial portion of its length such as 4/5 of its length has a series of perforations 61 therethrough throughout 360°. These perforations are of a dimension between $\frac{1}{8}$ and $\frac{1}{4}$ of an inch for illustration.

The drum 25 is of cylindrical shape and has a longitudinal axis which in the illustrative embodiment is inclined at an acute angle to the horizontal of 20° approximately. This angle can be varied as desired for a particular filtration project by the manual operation of the screw 17 to effectively modify the angle of inclination of the drum.

Figure 2:
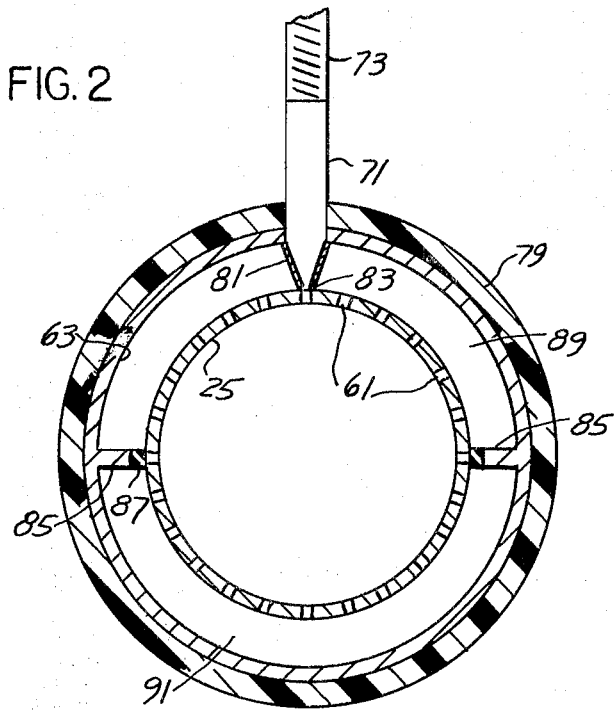
FIG. 2 is a vertical section taken in the direction of arrows 2—2 of FIG. 1.

An elongated metallic shell 63 having an exterior cylindrical layer of insulation 79, FIG. 2, also has a longitudinal axis similarly inclined to the axis of the drum. The shell receives and encloses the perforated portion 61 of the drum with its respective top and bottom end walls 67 and 68 being apertured to enclose portions of the drum outwardly of its perforations sealingly engaging said drum as at 69. The shell is stationarily mounted upon frame 65, schematically shown, which rests upon support 13.

Air plenum 71 which is inclined longitudinally downwardly and outwardly overlies said shell and at its lower end extends through the shell wall and communicates with an elongated air channel 81 mounted within said shell. The side walls of the channel converge downwardly, FIG. 2, and terminate in an elongated throated outlet 83 closely adjacent perforations 61 of the drum. The plenum at its upper end has an inlet 72 which through the flexible duct 73 is connected to the outlet 74 of high pressure air blower 75, schematically shown. The blower is suitably supported at as 101 and includes a chamber having a heater 77, schematically shown, by which air under pressure is heated up to 250° F. approximately for delivery through the duct into plenum 71. The temperature may vary between 200 to 300 degrees F., sufficient for melting of hardened particles of grease, fat or other hydrocarbons.

Air is delivered at 1000 cubic feet per minute approximately although this can vary between 500 and 1500 CFM. The heated air is projected through the plenum outletting through the channel 81, FIGS. 1 and 2, and the throated outlet 83 at increased pressure for direction radially onto and through drum perforations 61 along the length of said perforations.

Upon the interior of the shell, FIG. 2, are a pair of laterally spaced oppositely arranged baffles 85 which extend from the shell radially inward adjacent the surface of the drum. Elongated seals 87 are mounted upon the inner edges of the baffle for substantial wiping engagement with the perforated drum during rotation thereof. The arrangement of said baffles defines pressure chamber 89 above the drum and a filtered scum collection chamber 91 below the drum.

The function of the heated high pressure air delivered into the pressure chamber 89 is for passage radially through the drum apertures adjacent the outlet 83 and other drum perforations communicating with the pressure chamber during continuous rotation of the drum. The main thrust of the pressurized heated air is directly through those perforations in a line along the length of the drum directly adjacent the channel outlet 83.

The baffles 85 define below said drum the filtered scum accumulation chamber 91 which is at approximately atmospheric pressure. Outlet 93 adjacent the lower end of the shell communicates with the filtered scum collection chamber and includes a conventional control valve 95 by which filtered combustibles may be delivered to storage collector 97.

OPERATION

The hot perforated rotary drum revolves inside the insulated shell 63. The apparatus in the illustrative embodiment is tilted at approximately 20° to the horizontal. The acute angle of the longitudinal axis of the drum may be varied by adjustment of the screw leveling device 17, in FIG. 1.

Preheated scum is fed into the rotary drum 25 at its upper end as at 31 from the heated hopper 35 by a continuous feed, which can be regulated by the valve V.

During continuous rotation of the drum the scum proceeds down the drum and due to the application of high pressure heated air and the combustibles further melt and drop through the perforations 61 into the collection chamber 91, FIG. 2.

The perforations are blown clear as they revolve under high pressure air delivered through the channel 81 and the slot 83 in the upper pressure chamber 89.

The scum will be filtered through the drum before $\frac{2}{3}$ of the length has been traversed. The filtered debris will continue to the end of the drum, and assisted by the air pressure supplied from the plenum 71 and further assisted by the inflow of unfiltered scum at the upper end of the drum will eventually discharge through the outlets 57 at the lower end of the drum. The filtered hydrocarbons pass through the valved outlet 95 and thence to storage as at 97.

The foregoing apparatus is illustrative of one embodiment of apparatus for carrying out the present method, essentially the filtration from sewage scum of the combustibles and debris for effectively removing from sewage available energy source.

Figure 3:
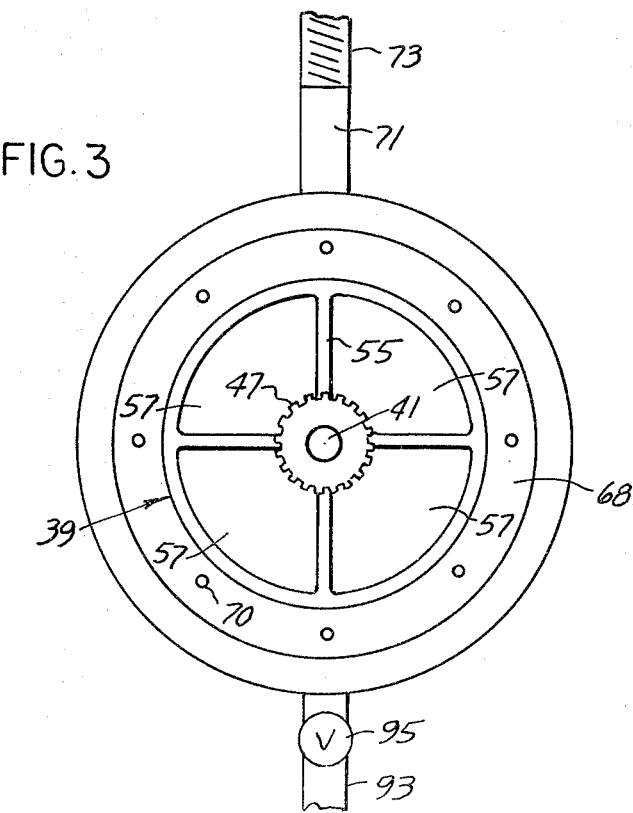
FIG. 3 is a vertical section taken in the direction of arrows 3—3 of FIG. 1.

The drawings, FIGS. 1, 2 and 3 are essentially schematic in illustrating the present apparatus by which the perforated portion of the rotating drum is sealed within an insulated shell.

The present invention contemplates the following method for the treatment of sewer scum which includes the following steps:

The collection of the scum from sewage and particularly municipal sewage, the scum is skimmed off and delivered to the preheating hopper 35.

Delivering the scum to the perforated filter drum 25 through the hopper outlet 33 and delivery pipe 31 which axially joins and is projected into the end wall 27 of the drum in sealing relation as shown at 29.

Continuously rotating of the drum upon its longitudinal axis which is inclined at an acute angle of approximately 20°.

Applying heated air under pressure to the exterior wall of the drum along a line over its length and through the perforations 61 for successively removing the debris from the perforations, heating and melting the combustibles and for advancing the accumulated debris along the length of the drum.

Discharging of the debris from the drum at its lower end as through the outlets 57, and Continuously collecting the filtered combustibles from the drum.

This collection of filtered combustibles is within the filtered scum chamber 91 of the insulated shell which surrounds and sealingly engages the rotating drum and which provides between the shell and the rotating drum a pressure chamber over the top thereof and a filtered scum collection chamber below the drum.

The blower 75 normally delivers heated air at 1000 CFM although this may range between 500 and 1500 CFM as desired. The heating element 77 within the blower is adapted to provide air at a temperature of 250° F. approximately although this temperature may vary between 200 and 300 degrees F. approximately as desired.

While the drum could be rotated as slow as 1 rpm, in the preferred embodiment of the method drum rotation is between 1 and 20 rpm for illustration.

The present method includes the preliminary step of preheating the collected scum before filtration thereof.

Having described my invention, reference should now be had to the following claims.

I claim:

1. The method of treating sewer scum including liquid and partly congealed combustibles and debris which includes the steps of:
   collecting the scum from sewage;
   delivering the scum to a filter drum perforated throughout 360 degrees;
   continuously rotating the drum at at least 1 RPM approximately upon a longitudinal axis inclined at an acute angle;
   applying air heated to at least 200 degrees F. approximately under pressure of at least 500 CFM approximately to the exterior wall of the drum along a line over its length and through the perforations therein for successively lifting the debris from the perforations, heating and melting the combustibles and for advancing the accumulated debris along the length of the drum;
   discharging the debris from the drum;
   and continuously collecting the filtered combustibles from the drum.

2. In the method of treating sewer scum of claim 1, the heated air being delivered at 1000 CFM, approximately.

3. In the method of treating sewer scum of claim 1, the heated air being delivered at 500 to 1500 CFM, approximately.

4. In the method of treating sewer scum of claim 1, the heated air being at a temperature of 250° F., approximately.

5. In the method of treating sewer scum of claim 1, the heated air being in the range of 200 to 300 degrees F., approximately.

6. In the method of treating sewer scum of claim 1, the angle of the drum inclination being 20°, approximately.

7. In the method of treating sewer scum of claim 1, the angle of the drum axis being adjustable.

8. In the method of treating sewer scum of claim 1, the drum being rotated at a speed of 1 to 20 rpm, approximately.

9. In the method of claim 1, the speed of the drum rotation being 8 to 20 rpm, approximately.

10. In the method of claim 1, the collected scum being preheated before delivery to the filter drum.

11. In the method of claim 1, the filtered combustibles being collected within a shell enclosing the drum perforations and having an outlet.

12. In the method of claim 1, the continuous feeding of scum into the drum assisting in advancing the debris longitudinally of the drum.

13. In the method of claim 1, the heated air being delivered at 500 to 1500 CFM, approximately, the heated air being in the range of 200 to 300 degrees F., approximately;
   the angle of the drum inclination being 20°, approximately; and
   the drum being rotated at a speed of 1 to 20 rpm, approximately.

14. Apparatus for filtering sewer scum containing liquid and partly congealed combustibles and debris comprising an elongated cylindrical drum having a perforated portion throughout 360 degrees and a longitudinal axis, mounted upon a support;
   means on the support journaling the drum at its opposite ends for rotation along its axis;
   the axis being inclined at an acute angle to the horizontal;
   rotative drive means connected to the drum for continuously rotating the drum;
   an apertured upper end wall on the drum, adapted to receive preheated sewer scum;
   an apertured lower end wall on the drum adapted to discharge collected debris from the drum interior;
   a cylindrical shell spaced from and enclosing the perforated portion of the drum having a similarly inclined longitudinal axis mounted upon the support, having apertured end walls sealingly engaging the drum outwardly of its perforations;
   spaced baffles upon the interior of said shell extending toward said drum; the shell and baffles defining a pressure chamber above the drum and a filtered scum collection chamber below the drum;
   an elongated air channel upon the interior of the shell along its length within the pressure chamber and having a throated outlet extending along and spaced from the perforations of said drum;
   a plenum mounted upon said shell intermediate its length having an outlet communicating with said channel and an inlet;
   an air blower spaced from the shell having a heater and an outlet for delivering heated air under pressure;
   a duct interconnecting said outlet and the plenum inlet;
   and a valved outlet adjacent the lower end of said shell communicating with said scum collection chamber.

15. In the filter apparatus of claim 14, the lower end wall being conical and terminating in an axial shank;

the means journaling the drum including bearings receiving said shank, and a pair of laterally spaced rollers supporting the upper end of said drum, outwardly of said shell.

16. In the filter apparatus of claim 15 and means adjustably mounting said rollers upon said support for variably adjusting said acute angle.

17. In the filter apparatus of claim 15, said drive means including a gear mounted on said shank;

and variable speed motor on said support having a drive shaft mounting a pinion in mesh with said gear.

18. In the filter apparatus of claim 15, the apertures in said conical lower end wall being elongated and tapered, with the lower-most apertures continuously discharging debris therethrough.

19. In the filter apparatus of claim 14, said acute angle being 20° approximately.

20. In the filter apparatus of claim 14, a downwardly inclined scum feed pipe axially extending through the upper end wall of the drum and sealed therein.

21. In the filter apparatus of claim 14, said shell having an exterior cover of insulating material.

22. In the filter apparatus of claim 14, there being a pair of spaced opposed inwardly extending baffles upon the interior of said shell along its length extending radially inward substantially to said drum, to define said pressure and collection chambers.

23. In the filter apparatus of claim 22, a sealing strip along the inner edges of said baffles in wiping registry with said drum.

24. In the filter apparatus of claim 14, said air channel converging towards its outlet for delivering high pressure heated air radially through said perforations.

25. In the filter apparatus of claim 14, said plenum tapering outwardly and downwardly for registry with said air channel for a portion of its length.

* * * * *